United States Patent Office 2,857,399
Patented Oct. 21, 1958

2,857,399

PROCESS FOR PREPARING 4-PHENYL-1,2-DITHIOLE-3-THIONE

Ellis K. Fields, Chicago, Ill., assignor to Standard Oil Company, Chicago, Ill., a corporation of Indiana No Drawing. Application March 26, 1956
Serial No. 573,588

5 Claims. (Cl. 260—327)

This invention relates to the preparation of phenyl trithione from alpha-methyl styrene by reaction with sulfur. The present application is a continuation-in-part of my pending application S. N. 433,788, filed June 1, 1954, now abandoned.

The preparation of trithiones by sulfurization of olefinic materials, including styrenes, is known. The known reaction however is largely of theoretical interest because of low yields of trithione and the difficult problem of purification presented in separating the pure trithione from the reaction mixture. Also, the reaction must be run in a bomb or pressure type apparatus at super-atmospheric pressure since the reaction goes at temperatures only above 200° C.

I have discovered that excellent yields of 2-phenyl trithione (4-phenyl-1,2-dithiole-3-thione) can be obtained from alpha-methyl styrene by a catalytic reaction conducted in a particular manner. According to my invention, the alpha-methyl styrene is gradually added to a reaction mixture comprising sulfur, an inert organic solvent and a small amount of a strong, hydrocarbon soluble organic base, more particularly a diaryl guanidine such as di-o-tolyl guanidine. The reaction mixtures is maintained at a temperature in the range of about 140 to 200° C., preferably 150 to 165° C. After completion of reaction, the reaction mixture is cooled and the trithione product is separated from the reaction solution as a crystalline product.

In the reaction, the structural configuration of alpha-methyl styrene appears to be important in obtaining the high yields of the catalytic reaction of the invention since the reaction goes less well with other alkenyl aromatics. Di-o-tolyl guanidine has particular value as a catalyst for promoting the desired reaction. Other aryl guanidines such as diphenyl guanidine have valve, giving approxinmately equivalent reaction rates, but the yields of trithione product with di-o-tolyl guanidine in general run significantly higher. Other hydrocarbon soluble, strong organic bases such as aliphatic amines may be used. Secondary and tertiary butyl amines are examples of useful liquid aliphatic amines providing reaction rates substantiallly equivalent to that of the guanidines. The catalysts are used in small concentrations, usually in the range of about 0.01 to 2% by weight, preferably about 0.2% by weight.

The process is further characterized by the addition of the alpha-methyl styrene feed gradually to sulfur in an inert organic reaction medium. I have found that when the reaction is conducted in ordinary fashion by admixture of the reactants, yields are low and the rate is very slow. The use of a large excess of sulfur helps promote the reaction but complicates the product separation and purification problem. Advantageously, an excess of alpha-methyl styrene to sulfur is used in the invention. The ratio may vary from about 1 mole of feed per gram-atom of sulfur to 1 mole per 5 gram-atoms of sulfur. I prefer to use a ratio in the range of 1 mole:1.5 gram-atoms to 1 mole:2.25 gram-atoms. The reaction is conducted at a temperature in the range of about 140° up to 200° C. preferably at about 150°–165° C. and the the addition of feed is continued at a rate maintaining reaction until the sulfur in the reaction zone is consumed, usually about 4 to 40 hours for batch operation.

The reaction medium may comprise any organic solvent which is sufficiently inert under the reaction conditions, i. e. does not react with sulfur to an extent interfering with yield and/or product quality. The solvent also should be sufficiently high boiling to permit reaction in the range of 150° to 165° C. without resorting to the use of elevated pressure. A tertiary-alkyl benzene such as t-butyl benzene is particularly suitable. It does not react with sulfur under the reaction conditions over a long period of time, and it has a sufficiently low boiling point to permit easy recovery by distillation. Other t-alkyl benzenes such as t-amyl and t-hexyl benzene also may be used. Lighter aromatics such as benzene are low boiling and require the use of pressure but otherwise are suitable. Aliphatic hydrocarbons tend to react over an extended reaction period, lowering the purity of the trithione product or resulting in higher consumption of solvent, and thus add to the cost of the process. The normal paraffins such as n-octane or n-decane are least objectionable from this standpoint.

A particular advantage of the process, in addition to high yields of the order of 70 to 90%, is the convenience in separation and purification. Product recovery may be accomplished simply by cooling the reaction mixture and filtering or otherwise separating the crystalline trithione product. The mother liquor then can be distilled at reduced pressure or in the presence of steam to recover the solvent and any unreacted feed. The recovered solvent and/or unreacted feed can be recycled. Additional trithiones may be recovered from the reaction mother liquor by partial evaporation followed by cooling and filtering. The process is susceptible of continuous operation with recycle. By contrast, the procedure of Bottcher and Luttringhaus (Ann. 557, 89, 1947) using a mixture of sulfur and olefinic feed results in unreacted sulfur and requires costly chemical separation techniques as through formation of a mercuric chloride adduct to recover a pure product.

The following examples are illustrative of the operation of the invention and of the advantages obtainable compared to more conventional means for conducting the reaction (compare Example I with Examples II and III).

*Example I*

To a solution of 19.2 grams (0.6 gram atom) sulfur and 0.394 gram di-o-tolyl guanidine in 95 ml. t-butyl benzene was added 47.2 grams (0.4 mole) α-methyl styrene dropwise over 8 hours. The red solution was kept at 1560° C. for 16 hours, then cooled to 5° C. There crystallized 17.9 grams, 70%, 4-phenyl-1,2-dithiole-3-thione, M. P. 120–121° C. Anal. calcd. for $C_9H_6S_3$: C, 51.42; H, 2.86; S, 45.72; mol. wt. 210. Found: C, 51.30; H, 3.00; S, 45.90; mol. wt. 209. The trithione filtrate gave, on distillation, 128 ml. (112 grams) of colorless distillate boiling at 110–135° C. at 135 mm., of which 82 gram is the original t-butyl benzene and 30 gram is α-methyl styrene. The residue weighed 9 grams.

*Example II*

A mixture of 129.3 ml. (1 mole) α-methyl styrene and 48 grams (1.5 gram-atoms) sulfur was heated at 156° C. After 144 hours the presence of free sulfur was tested by means of the ASTM copper strip corrosion test and the strip was still 10. The solution was cooled, precipitating 27 grams of sulfur, but no trithione. Distillation gave 119 cc. unreacted α-methyl styrene.

Example III

A mixture of 129.3 ml. (1 mole) α-methyl styrene 96 grams (3 gram-atoms) sulfur and 1.8 grams (0.6%) di-o-tolyl guanidine was heated at 156° C. After 18 hours the copper strip had dropped from 10 to 7. The mixture was cooled to 5° C., giving 32 grams (25% based on sulfur) 4-phenyl-1,2-dithiole-3-thione, M. P. 120° C. The filtrate was distilled in vacuo, giving 40 ml. α-methyl styrene and leaving 239 grams viscous reddish residue.

In summary, it will be seen that when no catalyst was used as in Example II, no trithione product was obtained. When a catalyst was used, but the sulfur and feed were reacted by mixing the reacting proportions together, a poor yield (25%) was obtained. Also, only 17% of the alpha-methyl styrene charge which was not converted to trithione remained in recoverable form. Using a catalyst by the process of the invention (Example I), a good yield (70%) of trithione was obtained, and 82% of the original alpha-methyl styrene unconverted to trithione was recovered.

I claim:

1. A process for preparing 2-phenyl trithione (4-phenyl-1,2-diothiole-3-thione) which comprises adding alpha-methyl styrene gradually to a reaction medium comprising sulfur and an inert organic solvent, conducting the reaction at a temperature in the range of about 140° to 200° C. in the presence of a catalytic amount of a strong, hydrocarbon soluble organic base, cooling the mixture after completion of reaction and separating crystallized trithione from the reaction liquor.

2. The process of claim 1 in which the temperature is maintained in the range of about 150° to 165° C.

3. The process of claim 1 in which solvent and unreacted feed are recovered from the reaction liquor by distillation for recycle.

4. The process of claim 1 in which the catalyst is an aryl guanidine.

5. The process of claim 1 in which the catalyst is di-ortho-tolyl guanidine.

References Cited in the file of this patent

UNITED STATES PATENTS 2,688,620     Gaudin     Sept. 7, 1954

FOREIGN PATENTS 874,447     Germany     Apr. 23, 1953
730,058     Great Britain     May 18, 1955

OTHER REFERENCES

Boettcher: Annalen, 557: 89–107 (1947).
MacArdle: "Use of Solvents", pages 1–20, 114–128.

UNITED STATES PATENT OFFICE
CERTIFICATE OF CORRECTION

Patent No. 2,857,399                                October 21, 1958

Ellis K. Fields

It is hereby certified that error appears in the printed specification of the above numbered patent requiring correction and that the said Letters Patent should read as corrected below.

Column 1, line 49, for "valve" read -- value --; lines 49 and 50, for "approxinmately" read -- approximately --; lines 55 and 56, for "substantiallly" read -- substantially --; line 71, for "1 mole:1:5" read -- 1 mole:1.5 --; column 2, line 39, for "557" read -- 557 --; column 3, line 2, for "129.3 ml. (1 mole)" read -- 258.6 ml. (2 moles) --.

Signed and sealed this 27th day of January 1959.

(SEAL)
Attest:

KARL H. AXLINE                                      ROBERT C. WATSON
Attesting Officer                                     Commissioner of Patents